US006308691B1

(12) United States Patent
Frank et al.

(10) Patent No.: US 6,308,691 B1
(45) Date of Patent: Oct. 30, 2001

(54) FUEL SUPPLY AGGREGATE WITH A ROTARY PUMP

(75) Inventors: Kurt Frank, Schorndorf; Stephanie Kaeser, Ludwigsburg, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/344,828

(22) Filed: Jun. 25, 1999

(30) Foreign Application Priority Data

Jun. 29, 1998 (DE) .............................................. 198 28 932

(51) Int. Cl.⁷ .................................................... F02M 37/04
(52) U.S. Cl. ............................................ 123/509; 417/540
(58) Field of Search ..................................... 123/509, 510, 123/516, 514; 417/540, 541, 542, 543

(56) References Cited

U.S. PATENT DOCUMENTS

| 4,844,621 | | 7/1989 | Umemura . | |
|---|---|---|---|---|
| 4,844,704 | * | 7/1989 | Jiro ........................................ | 123/509 |
| 4,878,518 | * | 11/1989 | Tuckey ................................. | 123/510 |
| 4,989,572 | * | 2/1991 | Giacomazzi .......................... | 123/509 |
| 5,046,471 | * | 9/1991 | Schmid ................................. | 123/510 |
| 5,186,152 | * | 2/1993 | Cortochiato .......................... | 123/510 |
| 5,368,001 | * | 11/1994 | Roche ................................... | 123/510 |
| 5,516,266 | * | 5/1996 | Talaski ................................. | 417/540 |
| 5,647,328 | * | 7/1997 | Fournier ............................... | 123/509 |
| 5,718,208 | * | 2/1998 | Brautigan ............................. | 123/516 |
| 5,787,865 | * | 8/1998 | Harris ................................... | 123/509 |
| 5,875,816 | * | 3/1999 | Frank .................................... | 123/510 |
| 5,980,221 | * | 11/1999 | Uffelman ............................. | 417/540 |

FOREIGN PATENT DOCUMENTS

| 44 44 854 A1 | 6/1996 | (DE) . | |
|---|---|---|---|
| 40 00 341 A | 2/1998 | (DE) . | |
| 08200175 | * 8/1996 | (EP) ..................................... | 123/510 |
| 0 903 489 A | 3/1999 | (EP) . | |
| 2 241 741 A | 9/1991 | (GB) . | |
| 97 017 04 A | 1/1997 | (WO) . | |

* cited by examiner

Primary Examiner—Carl S. Miller
(74) Attorney, Agent, or Firm—Michael J. Striker

(57) ABSTRACT

A fuel supply aggregate has a fuel pump formed as a rotary pump and having at least one impeller with a plurality of vanes for supplying fuel from a tank, the fuel pump having an inlet connection, and a fuel throughflow noise damper located upstream of the fuel inlet connection of the fuel pump.

5 Claims, 3 Drawing Sheets

US 6,308,691 B1

FUEL SUPPLY AGGREGATE WITH A ROTARY PUMP

BACKGROUND OF THE INVENTION

The present invention relates generally to fuel supply aggregates. More particularly, it relates to a fuel supply aggregate of an internal combustion engine of a motor vehicle.

In the above mentioned supply aggregates, mainly volumetric pumps, such as substantially toothed gear pumps have been used. These pumps operate with a revolution frequency of several tens hertz and produce a noise spectrum which is dominated by the revolution frequency and several low harmonics. This noise can be dampened by a vibration-dampening suspension of the supply pump without difficulties. Therefore, it can be no longer heard in addition to the running noise of the simultaneously operating the internal combustion engine.

The manufacturing cost for a fuel supply aggregate can be reduced and its reliability can be increased when instead of the volumetric pump, a rotary pump can be used. For example, such a pump can be used which during its pump action on the at least one rotatable impeller provides an acceleration applied to the fluid to be pumped.

Rotary pumps because of their construction have a different noise spectrum than volumetric pumps. A rotary pump for use in a fuel supply aggregate must be compact, and therefore the diameter of the impeller must be small. In order to obtain however the required pumping action, the impeller must rotate with high speed and must carry on its periphery a great number of vanes, frequently 40–80 pieces in order to move the fluid to be pumped. The running noise of these pumps has not only a portion of the rotation frequency of the impeller and several low harmonics, but also additionally a portion of a frequency which corresponds to the product of the rotary speed and the number of the vanes. The last portion forms a high frequency whistle tone with a frequency up to 16 kHz which is found by many people as unacceptable. Since such a frequency portion is not contained in the running noise of an internal combustion engine supplied by the fuel aggregate, it is clearly heard at low intensities.

The disadvantage of the rotary pumps prevented their use in fuel supply aggregates, in particular for motor vehicles. It has been attempted to fight the vessel noise by a different design of the vanes of the impeller and an irregular arrangement of the vanes on the impeller. As a result the spectrum of the vessel noise is wider, the noise is thereby similar to a high frequency noises, and is no longer so penetrating. However, the high frequency noise remains still hearable.

The solution, when compared to a rotary pump with a uniformly shaped impeller, is relatively costly. The reason is that the manufacture of the non uniformly shaped impeller is substantially more expensive and its imbalance requires an increased care.

SUMMARY OF THE INVENTION

Accordingly, it is an object of the present invention to provide a fuel supply aggregate, which avoids the disadvantages of the prior art.

In keeping with these objects and with others which will become apparent hereinafter, one feature of present invention resides, briefly stated in a fuel supply aggregate which has a fuel pump formed as rotatory pump and having at least one impeller with a plurality of vanes for supplying fuel from a tank, wherein a fuel throughflow noise damper is arranged upstream of a fuel inlet connection of the fuel pump.

When the fuel supply aggregate is designed in accordance with the present invention, it has the advantage of a favorable price and a simpler construction of a supply aggregate with a rotary pump with a non loud operational noise of a volumetric pump.

A place-saving arrangement for the noise damper is provided by its location in a pre-chamber before an inlet connection of the rotatory pump. A wall of the pre-chamber can be formed partially by a suction filter, through which the fuel to be supplied enters in the pre-chamber.

In accordance with the present invention, the noise damper can extend between the suction filter and the inlet connection over a whole cross-sectional surface of the pre-chamber.

The noise damper can be arranged also in a housing with an outlet pipe which is mounted by close to an inlet connection of the rotary pump. For example it can extend into it or be screwed in it.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
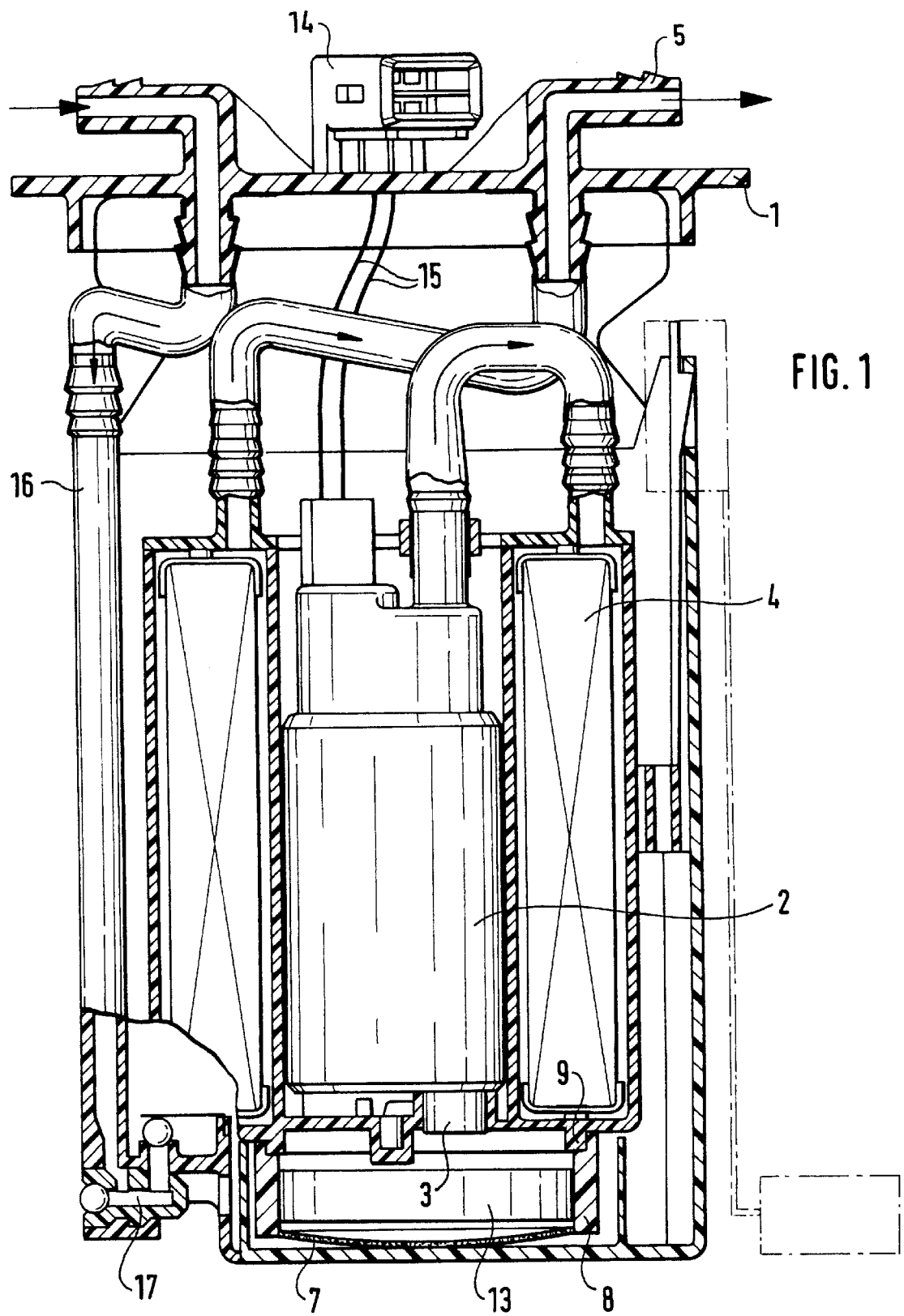
FIG. 1 is a view showing a fuel supply aggregate in accordance with a first embodiment of the present invention.

A first embodiment of an inventive fuel supply aggregate is shown in a longitudinal section in FIG. 1. It is inserted in a fuel tank of vehicle through an opening in its wall and is mounted in the opening by a flange 1. A substantially cylindrical housing of the fuel supply module has a cylindrical inner chamber 11 and an outer chamber 12 which surrounds the inner chamber in a ring-shaped manner. An electric fuel pump of a rotatory type is accommodated in the inner chamber 11. An inlet connection or a suction pipe 3 of the fuel pump 2 extends through an opening in a bottom of the inner chamber 11.

The pump 2 in a known matter has an electric motor which drives an impeller with a rotary speed of approximately 6000–24000 revolutions per minute. The impeller has 40–80 identical vanes which are uniformly distributed over its periphery. They have a diameter of approximately 35–50 mm. The fuel aspirated and supplied by the fuel pump 2 first passes in the connection at the fuel pump 2, a filter 4 in the outer chamber 12, and then is supplied to a supply conduit 5 of a not shown internal combustion engine.

A flat-cylindrical pre-chamber 6 is arranged under the bottom of the housing 10. The chamber 6 is formed by a ring-shaped side wall 8 which is fitted or screwed on a complimentary projection 9 on the bottom of the housing 10, and a bottom wall which is formed by a suction filter 7 of a thin layer of a rigid, permeable fiber material. In order to better withstand the pressure of the fuel which flows in the fuel pump 2 through the suction filter 7, the suction filter is slightly curved downwardly.

A noise damper 13 is arranged in the pre-chamber so that it covers the whole cross-section of the inlet connection 3 and therefore prevents exiting of a running noise of the pump 2 transmitted by the fuel, to the straight path from the inlet connection 3. In the shown example, the noise damper 13 extends over the whole horizontal cross-section of the pre-chamber 6 and is located close to the side wall 8. Due to this arrangement, also reflecting running noise can not be released from the suction pipe 3 without being dampened.

The noise damper 13 has an inner design which will be explained in detail later on. The fuel pump 2 is supplied with energy through a plug connector 14 and through electric conductors 15 extending through the flange 1.

Fuel which is not used by the internal combustion engine is supplied through a return conduit 16 to a jet pump 17. The jet pump is located in the vicinity in the bottom of the tank and faces an opening 18 in the wall of the bucket 19. The bucket surrounds the pre-chamber 16. The fuel jet produced by the jet pump 17 removes fuel from the tank through the opening 18 in the bucket 19 and supplies it to a fuel level in the bucket 19 which is higher when compared with the rest of the tank.

Figure 2:
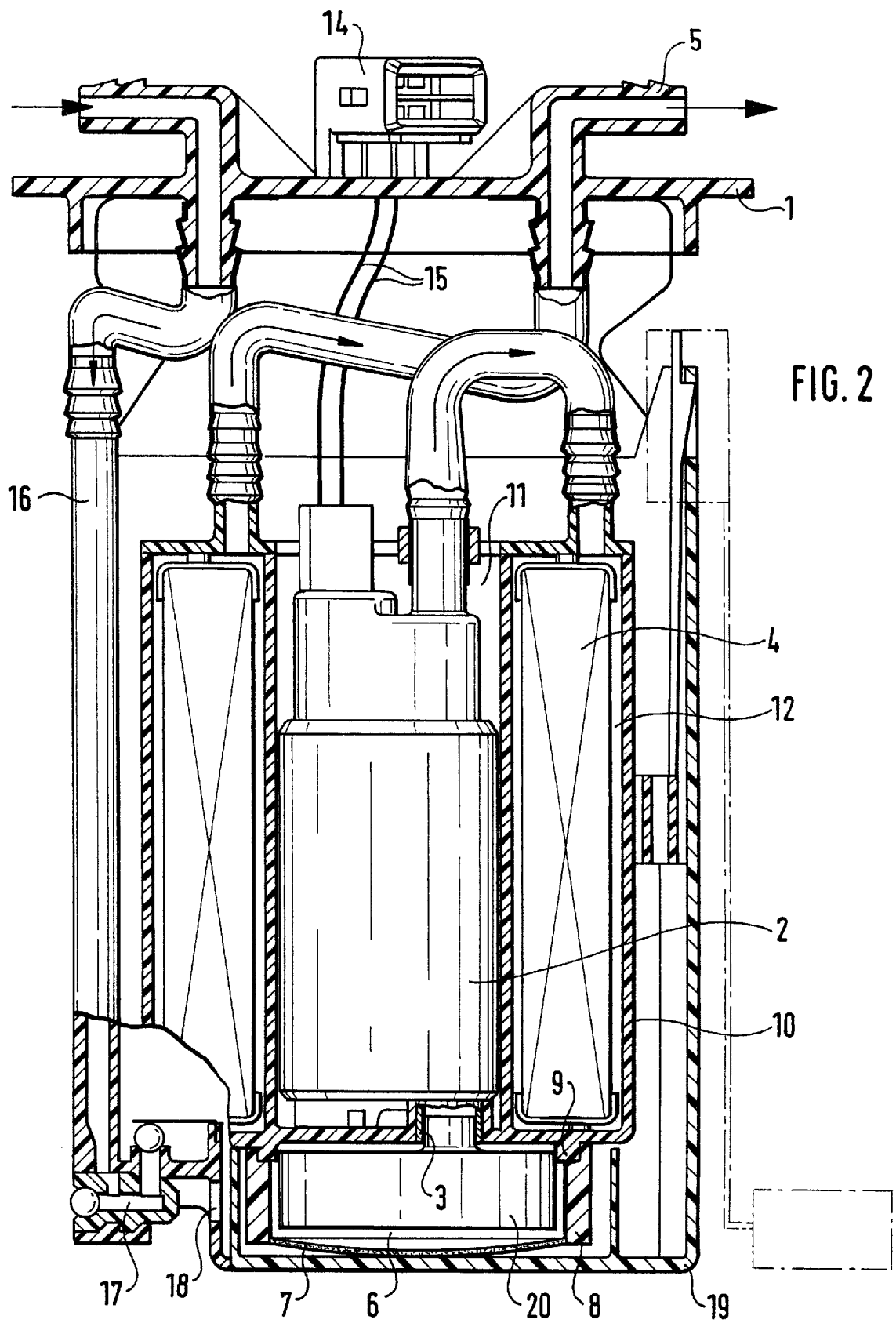
FIG. 2 is a view showing a fuel supply aggregate in accordance with a second embodiment of the present invention.

FIG. 2 shows a second embodiment of the inventive fuel supply aggregate. Parts of this embodiment which correspond to the parts of the first embodiment are identified with the same reference numeral and not described in detail. The noise damper 20 in this embodiment includes a fixed housing with an outlet pipe 21 which is tightly inserted in the suction pipe 3 of the fuel pipe 2. In this embodiment an efficient damping also of reflected running noise is guaranteed without tightly connecting the noise damper 20 to the side wall 8. Therefore, inlet openings for the fuel can be arranged substantially arbitrarily on the cylindrical housing of the noise damper 20, including also Its upper side, depending on the preference.

In a not shown variant of this embodiment, the inlet connection 3 of the fuel pump 2 can be provided with an inner thread and the outer pipe 21 of the noise damper can be provided with a complimentary outer thread. The noise damper 20 and the pre-chamber 6 can have such a cross-section that the noise damper can be freely turned about the axis of its outlet pipe and screwed into the suction pipe 3.

Figure 3:
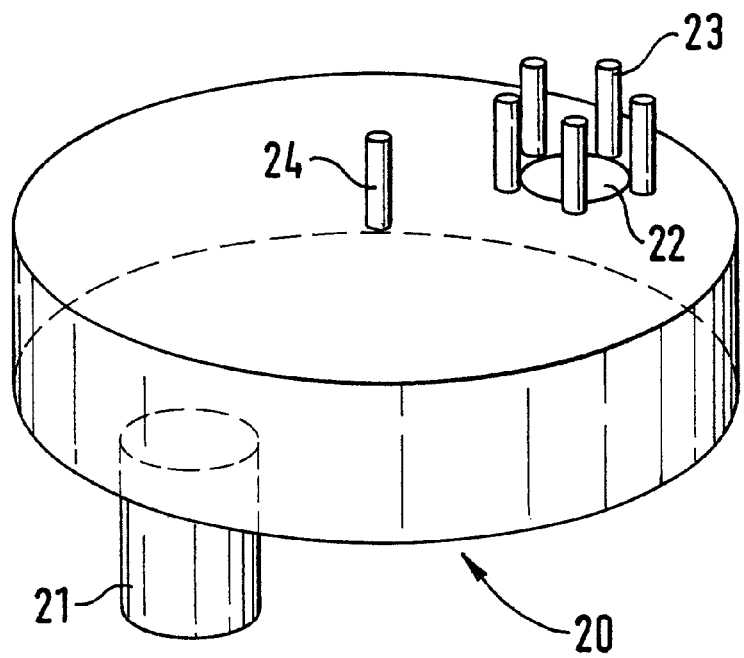
FIG. 3 is a perspective view of a noise damper which is used in the inventive fuel supply aggregate.

FIG. 3 shows a perspective view of a further variant of a noise damper, which is used in the inventive fuel supply aggregate. The noise damper 20 is inclined when seen from below, with the outlet pipe 21 facing away from an observer. The inlet opening is arranged at the side of the body of the noise damper which faces the observer. It is surrounded by a plurality of projections which form a ring. Further projections 24 can be arranged on the upper surface of the noise damper. The function of the projections is to support inwardly the mounting in the pre-chamber 6 of the suction filter 7. Its further objective is to prevent a contact of the suction filter 7 with the upper surface of the noise damper and the resulting reduction of the effective cross-sectional surface of the suction filter 7, which can occur in the event of high pressure of the throughflow fuel, a short time increase of the fuel consumption, or progressing dirtying of the suction filter.

The noise damper in its interior can be formed differently. It can be formed completely as a porous, vibration-damping material, for example an open pore foam material. Such a material provides a low flow resistance to the fuel and dampens the running noise exiting the inlet connection 3 by dissipation of the vibrations. This possibility comes into consideration particularly for the fuel supply aggregate shown in FIG. 1.

Figure 4:
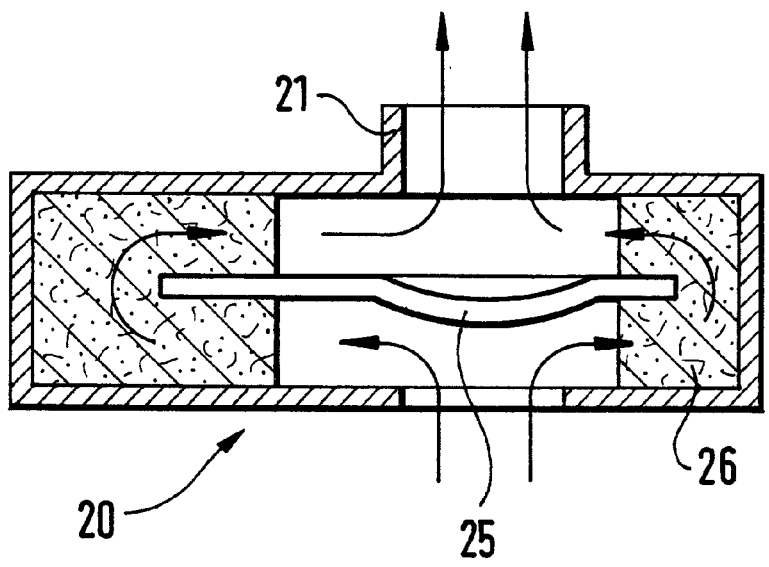
FIG. 4 is a view showing a cross-section of the noise damper of the present invention.

Another possibility is shown in FIG. 4. The noise damper shown in this figure has a flat reflector which is arranged in a housing and formed as an air-filled chamber 20. Over its whole outer periphery, it is embedded in a porous, vibration-dampening material 26. The material 26 extends ring-shaped around the whole periphery of the chamber 20. The fuel which enters through the lower inlet opening 22 is laterally deviated on the reflector 25, passes through the porous material 26, and exits through the outlet pipe 21 in the fuel pump. The running noise coming from the fuel pump through the outlet pipe 21 is to a great degree reflected by the reflector 25 back into the pump. Further dampening is performed in the material 26.

It will be understood that each of the elements described above, or two or more together, may also find a useful application in other types of constructions differing from the types described above.

While the invention has been illustrated and described as embodied in fuel supply aggregate with a rotatory pump, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A fuel supply aggregate, comprising a fuel pump formed as a rotary pump and having at least one impeller with a plurality of vanes for supplying fuel from a tank, said fuel pump having a fuel inlet connection; and a fuel throughflow noise damper located upstream of said fuel inlet connection of said fuel pump, said fuel pump having a pre-chamber located before said fuel inlet connection, said noise damper being located in said pre-chamber, said pre-chamber having a wall which is formed partially by a suction filter through which a fuel to be supplied enters said pre-chamber.

2. A fuel supply aggregate as defined in claim 1, wherein said noise damper has a housing through which fuel flows, said housing having an outlet pipe which is tightly connected with said fuel inlet connection of said fuel pump.

3. A fuel supply aggregate as defined in claim 1, wherein said noise damper extends between said suction filter and said fuel inlet connection over a whole cross-sectional area of said pre-chamber.

4. A fuel supply aggregate as defined in claim 1, wherein said noise damper at a side which faces said suction chamber is provided with a plurality of spacer projections.

5. A fuel supply aggregate as defined in claim 1, wherein said noise damper includes a reflector.

* * * * *